US010412898B2

(12) United States Patent
Coen et al.

(10) Patent No.: US 10,412,898 B2
(45) Date of Patent: Sep. 17, 2019

(54) BALE LENGTH MEASUREMENT SYSTEM AND METHOD

(71) Applicant: CNH Industrial America LLC, New Holland, PA (US)

(72) Inventors: Tom Coen, Zemst (BE); Didier O. M. Verhaeghe, Ypres (BE)

(73) Assignee: CNH Industrial America LLC, New Holland, PA (US)

( * ) Notice: Subject to any disclaimer, the term of this patent is extended or adjusted under 35 U.S.C. 154(b) by 289 days.

(21) Appl. No.: 14/781,919

(22) PCT Filed: Mar. 27, 2014

(86) PCT No.: PCT/EP2014/056238
§ 371 (c)(1),
(2) Date: Oct. 2, 2015

(87) PCT Pub. No.: WO2014/161773
PCT Pub. Date: Oct. 9, 2014

(65) Prior Publication Data
US 2016/0029565 A1 Feb. 4, 2016

(30) Foreign Application Priority Data

Apr. 2, 2013 (BE) .............. BE2013/0224

(51) Int. Cl.
A01F 15/08 (2006.01)
A01F 15/14 (2006.01)
G01B 21/02 (2006.01)
G01B 21/06 (2006.01)

(52) U.S. Cl.
CPC ........ *A01F 15/148* (2013.01); *A01F 15/0858* (2013.01); *G01B 21/02* (2013.01); *G01B 21/06* (2013.01); *A01F 2015/0866* (2013.01)

(58) Field of Classification Search
CPC ............... A01F 15/0858; A01F 15/148; A01F 2015/0866; G01B 21/02; G01B 21/06
USPC .......................................... 702/94
See application file for complete search history.

(56) References Cited

U.S. PATENT DOCUMENTS

| 4,674,403 | A | | 6/1987 | Bryant et al. |
| 5,226,356 | A | * | 7/1993 | Schrag ............. B30B 9/3025 100/41 |
| 5,783,816 | A | | 7/1998 | McPherson |
| 5,988,053 | A | | 11/1999 | Leupe et al. |
| 6,035,773 | A | | 3/2000 | Rempe |

(Continued)

FOREIGN PATENT DOCUMENTS

| EP | 0857414 A1 | 8/1998 |
| FR | 2676611 A1 | 11/1992 |

(Continued)

*Primary Examiner* — Duy T Nguyen
(74) *Attorney, Agent, or Firm* — Patrick M. Sheldrake; Peter M. Zacharias

(57) ABSTRACT

Bale measuring method for a rectangular baler includes the steps of: measuring a movement of a binding material that is being tied around a bale; using the measured movement of the binding material to calibrate a measurement and calculation tool for measuring a movement of the bale in the baler and for calculating a length of the bale based on said measurement; determining the length of the bale using the calibrated measurement and calculation tool as the bale moves backward in the baler.

16 Claims, 3 Drawing Sheets

(56) References Cited

U.S. PATENT DOCUMENTS

| | | |
|---|---|---|
| 6,708,478 B1 | 3/2004 | Mesmer et al. |
| 7,404,355 B2 | 7/2008 | Viaud et al. |
| 8,011,295 B1 | 9/2011 | Smith et al. |
| 2004/0187468 A1 | 9/2004 | Krone et al. |
| 2006/0012176 A1 | 1/2006 | Schoonheere et al. |
| 2009/0049817 A1 | 2/2009 | Viaud |
| 2012/0042792 A1 | 2/2012 | Smith |
| 2012/0245801 A1* | 9/2012 | Seeger ................ A01F 15/0825 701/50 |

FOREIGN PATENT DOCUMENTS

| | | |
|---|---|---|
| FR | 2754138 A1 | 4/1998 |
| WO | 2014060245 A1 | 4/2014 |

\* cited by examiner

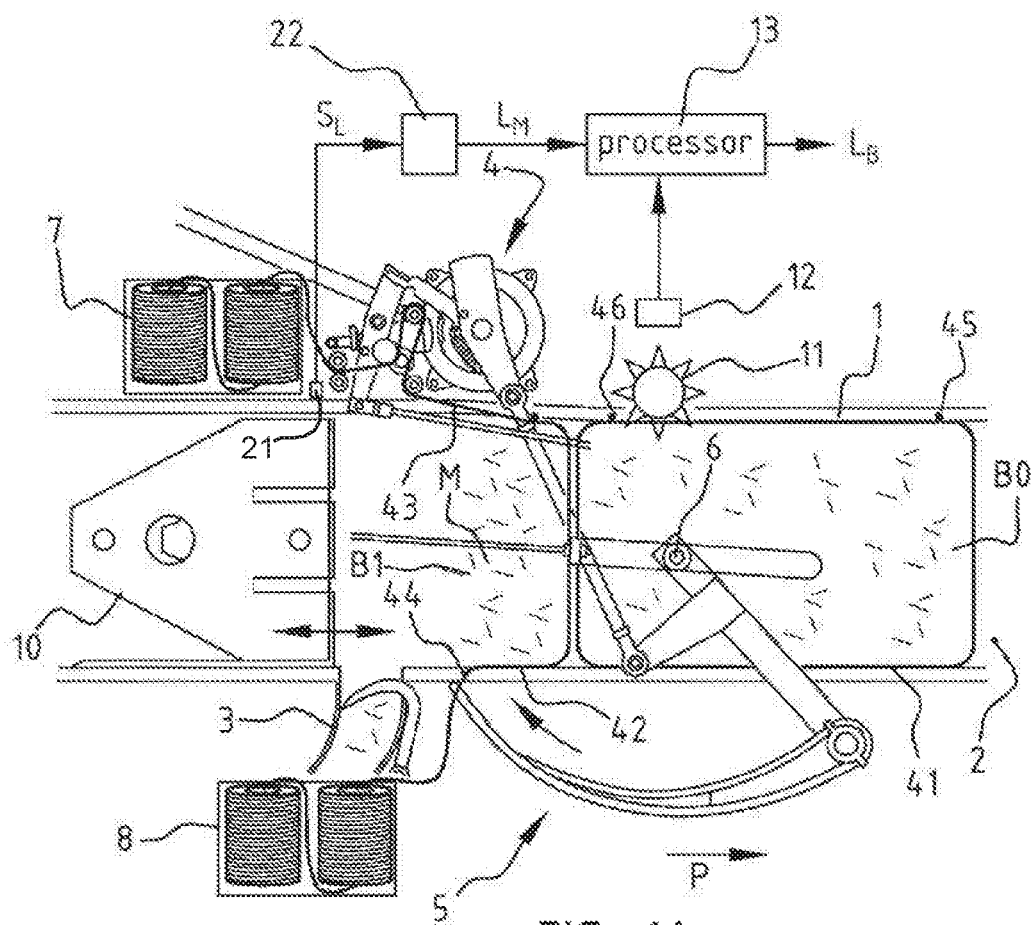
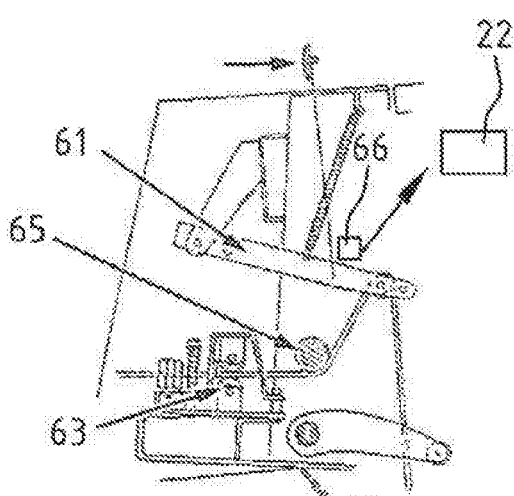
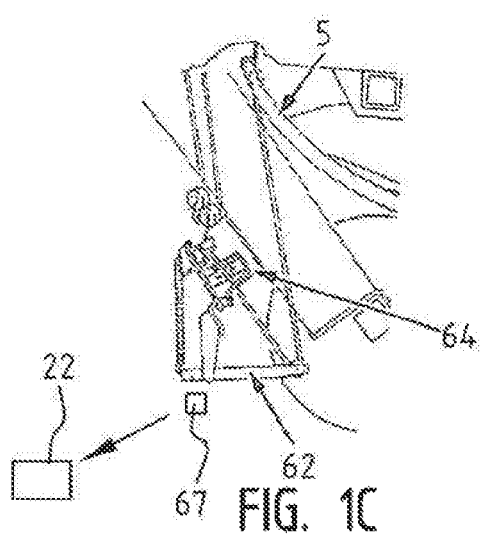
FIG. 1A
FIG. 1B
FIG. 1C

BALE LENGTH MEASUREMENT SYSTEM AND METHOD

This application is the US National Stage filing of International Application Serial No. PCT/EP2014/056238 filed on Mar. 27, 2014 which claims priority to Belgian Application BE2013/0224 filed Apr. 2, 2013, each of which is incorporated herein by reference in its entirety.

FIELD OF THE INVENTION

The present invention relates to a bale measuring method and system for a rectangular baler.

BACKGROUND OF THE INVENTION

Rectangular bales are able to maintain their shape by means of a series of parallel extending twine loops, provided lengthwise around the bales. Balers typically use automatic knotters by which e.g. two knots are made on every loop for binding a bale. An example of such a double knotter system for a baler is disclosed in US 2006/0012176 and in BE 2012/0697 in the name of the Applicant.

At present bale length measurements are performed using a star wheel engaging the crop material. However, the parameters of the crop material, such as density, humidity, crop type, etc, may influence the amount of slip occurring as the star wheel rotates. This may lead to inaccurate measurement results.

U.S. Pat. No. 5,988,053 in the name of the Applicant discloses a system for measuring the movement of the twines to detect a wide range of mistie conditions, such as broken or jammed strands.

SUMMARY OF THE INVENTION

The object of the present invention is to improve existing bale length measurement systems and methods, and in particular to provide a bale length measurement system and method which is well adapted to work with different crop material parameters.

According to an embodiment of the invention the bale measuring method for a rectangular baler comprises the following steps. A movement of a binding material that is being tied around a bale is measured. The measured movement of the binding material is used to calibrate a measurement and calculation tool, said measurement and calculation tool being adapted for measuring a movement of the bale in the baler and for calculating a length of the bale based on said measurement. The length of the bale is determined using the calibrated measurement and calculation tool as the bale moves backward in the baler.

Such an embodiment has the following advantages. The measurement of the movement of the binding material will give an accurate indication of the movement of the crop material and can be used to calibrate a tool which measures the movement of the bale itself. This measurement of the movement of the bale itself may be influenced by crop material parameters, but by performing first a calibration using a measurement of the movement of the binding material, an accurate result can be obtained. For completeness it is noted that a measurement of the binding material over the full length of the bale to get an indication of the bale length is usually not possible because of the knotting cycles, and other disturbing factors. However, according to embodiments of the invention, the measured movement of the binding material is merely used to calibrate the tool which measures the movement of the bale itself, so that the measurement of the binding material can be done during any suitable period and does not need to be performed over the full length of the bale.

According to a preferred embodiment the measurement and calculation tool comprises a measuring wheel which engages in the crop material and rotates as crop material is being moved in the baler. The calibrating may then comprise determining at least one calibration parameter. For determining the length of the bale, the number of rotations of the measuring wheel is counted as the bale moves backward in the baler and the length of the bale is determined based on said number of rotations and said at least one calibration parameter.

According to a preferred embodiment of the invention, the binding material is tied around the bale by performing a first knot at a first end of the bale and a second knot at a second end of the bale. The movement of the binding material may then be measured after performing the first knot and before performing the second knot. In that way an accurate measurement of the movement of the binding material may be obtained for calibrating the measurement and calculation tool, avoiding zones surrounding the knotting activity. The measuring of the length of the binding material may be started e.g. a predetermined time after performing the first knot and may be stopped e.g. when a predetermined value for the length of the movement is reached.

According to another embodiment, the movement of the binding material is measured between a first time corresponding with a first number of plunger strokes performed by the baler since the beginning of the formation of the bale, and a second time corresponding with a second larger number of plunger strokes performed by the baler since the beginning of the formation of the bale.

According to a preferred embodiment of the invention calibrating the measurement and calculation tool consists in determining a correction factor based on a comparison of the measured movement of the binding material with the measured movement of the bale, said movements of the binding material and the bale being measured at the same time.

According to a preferred embodiment of the invention the method further comprises triggering a tying mechanism of the baler when the determined length of the bale reaches a predetermined value. Because the length of the bale can be determined in an accurate way, also the triggering of the tying mechanism can be done in an improved way.

According to a further developed embodiment of the invention the binding material that is being tied around the bale is tensioned using tensioning means, e.g. slacker arms, and the position of the tensioning means is measured. The measured positions may then be used together with the measured movement of the binding material to calibrate the measurement and calculation tool. Typically the position is measured at least at the beginning and at the end of the measured movement of the binding material. In that way any buffering of the binding material can be taken into account, improving the accurateness of the calibration.

According to another aspect of the invention, there is provided a bale measuring system for a rectangular baler comprising a binding material measurement system and a measurement and calculation tool. The binding material measurement system is adapted for measuring a movement of a binding material that is being tied around a bale. The measurement and calculation tool is adapted for measuring a movement of the bale in the baler; for determining at least one calibration factor using the movement of the binding material as measured by the binding material measurement system and the measured movement of the bale; and for determining the length of the bale using the at least one calibration factor and the measured movement of the bale.

According to a preferred embodiment of the invention the measurement and calculation tool comprises a measuring wheel which is adapted to engage in the crop material and to rotate as crop material is being moved in the baler; a sensor adapted for measuring the rotation of the measuring wheel; and a processor adapted for determining the length of the bale based on the measured rotation and the at least one calibration parameter. The sensor can be any suitable sensor, e.g. a rotary encoder, a hall effect sensor, an optical sensor, a mechanical or electrical counter, etc.

According to a preferred embodiment of the invention the bale length measurement system is for use in a baler with a knotter adapted to perform a first knot at a first end of the bale and a second knot at a second end of the bale. The binding material measurement system may then be adapted to measure the movement of the binding material after performing the first knot and before performing the second knot. The binding material measurement system may be adapted to start the measurement at a predetermined time after performing the first knot and to stop measuring when a predetermined value for the movement of the binding material is reached.

According to a preferred embodiment of the invention the measurement and calculation tool is adapted to determine the at least one calibration factor based on a comparison of the measured movement of the binding material with the measured movement of the bale, said movements of the binding material and the bale being measured at the same time.

According to a preferred embodiment of the invention the bale measuring system is for use in a baler with a tying mechanism, and further comprises a triggering means adapted for triggering the tying mechanism of the baler when the determined length of the bale reaches a predetermined value.

Finally according to another embodiment of the invention, there is provided a baler including an embodiment of a bale measuring system as disclosed above.

BRIEF DESCRIPTION OF THE DRAWINGS

The advantages of this invention will be apparent upon consideration of the following detailed disclosure of exemplary non-limiting embodiments of the invention, especially when taken in conjunction with the accompanying drawings wherein:

FIG. 1A is a schematic view of a baler having a double knotter tying mechanism and comprising an embodiment of a bale measuring system of the invention;

FIGS. 1B and 1C are detailed schematic views of an embodiment of upper and lower binding material guiding and tensioning means, respectively;

DETAILED DESCRIPTION OF THE PREFERRED EMBODIMENT

Figure 2C:
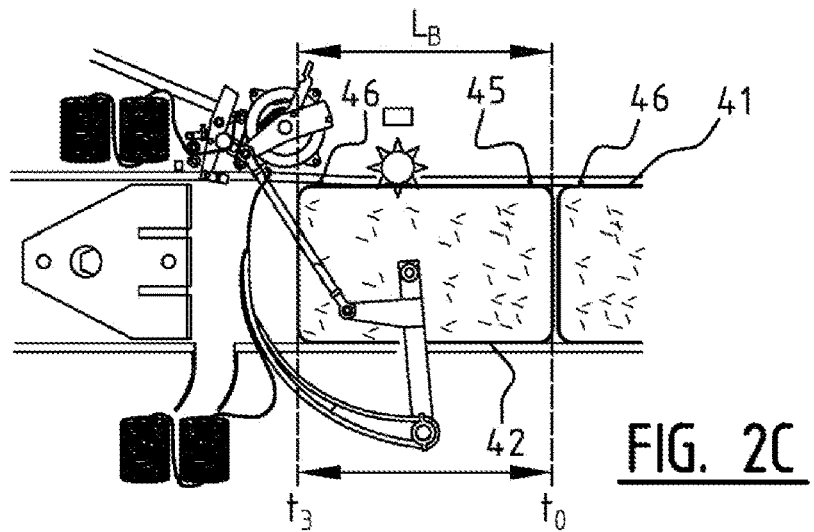
FIGS. 2A-2C illustrate three consecutive steps in the baler of FIG. 1, as a bale is moving backward in the bale chamber.

In the description which follows and in certain passages already set forth, the principles of the present invention will be described in terms of "twine" and "knots" formed in such twine. However, it is to be recognized that such principles extend to any type of binding material (twine, string, etc.) and twisted junctions of binding material.

Many of the fastening, connection, processes and other means and components utilized in this invention are widely known and used in the field of the invention described, and their exact nature or type is not necessary for an understanding and use of the invention by a person skilled in the art, and therefore they will not be discussed in significant detail.

The baler illustrated in FIG. 1 has a rectangular bale case 1 that is supported by ground wheels (not shown). The bale case 1 defines a bale chamber 2 wherein material M is pushed in through a curved duct 3. A plunger 10 reciprocates within the bale case 1 to intermittently pack fresh charges of material from the duct 3 rearward in the chamber 2 in the direction of the arrow P. When the bale reaches a predetermined size, a tying mechanism with a set of needles 5 is activated. As will be appreciated, the tying mechanism 4 comprises a set of individual knotters 4 provided crosswise on top of the bale case 1 at intervals. Each knotter 4 has an associated needle 5 for assisting in forming an individual loop around a finished bale B0, B1. When the bale B0, B1 needs tying, the knotters 4 and their needles 5 are driven to initiate the tying operation. The knotter 4 may be similar in many respects to the knotter disclosed in US 2006/0012176 in the name of the Applicant or in BE 2012/0697, the disclosure of which is herein incorporated by reference.

Figure 2B:
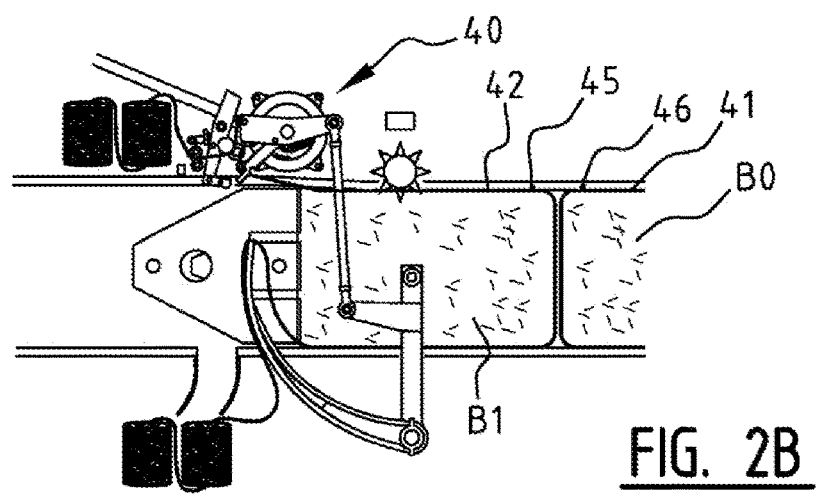
Figure 2A:
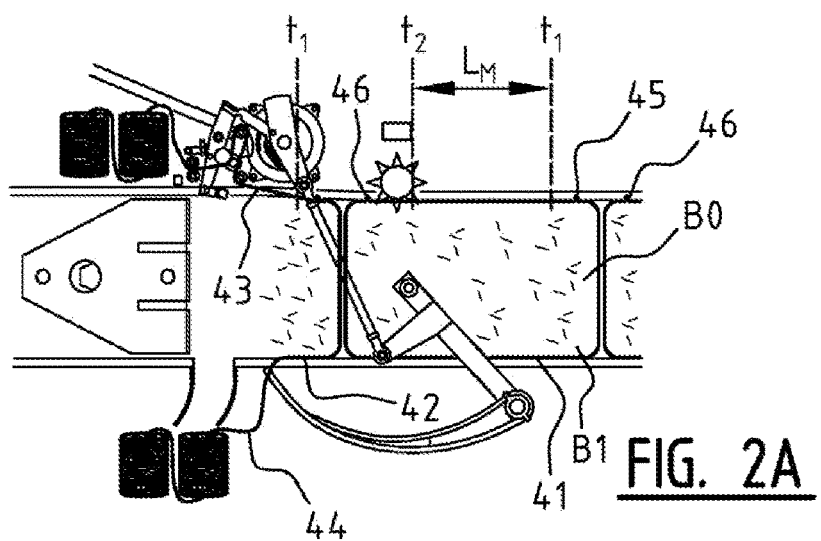

The needle 5 is swingably mounted on the bale case 1 by a pivot 6 and is swung back and forth across the bale chamber 2, see FIGS. 2A-2C, between an "at-home" or rest position fully below the bale case 1 and a "full-throw" position extending completely across the bale case 1. With reference to FIGS. 1 and 2, to the left of loop 41 is a partial loop 42 which is in the process of being formed. The top strand 43 emanates from a source of twine supply 7, while the bottom strand 44 emanates from a second source of twine supply 8. In FIG. 2B, a first knot 45 of bale B1 is in existence, and the bale B1 is approaching a length where the needle 5 is swinging into operation and presents the strands 43 and 44 to the knotter 4 to start an operation cycle in which two consecutive knots are being formed. In a finished bale B0, B1, the loop 41, 42 is made from two strands of binding material, i.e. one strand 43 along the top side of the bale and a second strand 44 along the bottom side of the bale and its two opposite, vertical ends.

In a baler, it is desirable to measure the length of a bale that is formed. FIG. 1 illustrates a bale measuring system according to an embodiment of the present invention. The bale measuring system comprises a twine measurement system 21, 22, as well as a measurement and calculation tool 11, 12, 13 for determining the length of the bale.

The twine measurement system can be any suitable twine measurement system, and typically includes twine sensors 21 and a processing part 22. The twine sensors can be e.g. rotary encoders, hall effect sensors, optical sensors, mechanical or electrical counters, etc. The signal SL measured by the twine sensors 21 is sent to the processing part 22 which is adapted to determine the length of twine dispensed from twine source 7. In the example illustrated in FIG. 1, the length of the upper twine 43 is measured. The skilled person will understand that it is also possible to measure the length of the lower twine 44, or to measure both the upper and the lower twines 43, 44 using twine length measurement systems.

Without loss of generality, the twine measurement system may further comprise a sensor 66, 67 or other suitable measurement means for determining the position of the twine tensioning means, here the upper and lower slacker arm 61, 62, see FIGS. 1B and 1C. A parameter representative for the measured position of the upper and lower slacker arm 61, 62 is sent to the processing part 22 to further improve the accurateness of the calculation of the length of the twine that has moved along the bale. Typically the position is measured at least at the beginning and at the end of the measured movement of the twine. In that way any buffering of the binding material can be taken into account. For completeness it is noted that in the illustrated embodiment the twine guiding and tensioning means further comprise an upper twine tensioner 63 and a lower twine tensioner 64, and the upper twine is further guided along the knife finger drive shaft 65. The skilled person understands that the twine guide and tensioning means can be implemented in a different way, and that for embodiments of the present invention determining the position of any moveable parts along which the twine is guided, may be advantageous.

The measurement and calculation tool comprises a star wheel 11 which is mounted in such a way that it engages in the crop material M and rotates as crop material M is being moved in the baler. A sensor 12 is adapted for measuring the rotation of the star wheel 11. The star wheel sensor 12 can be any suitable sensor, and can be e.g. a rotary encoder, a hall effect sensor, an optical sensor, a mechanical or electrical counter, etc. Further, the measurement and calculation tool comprises a processor 13 processing the signals SB received from star wheel sensor 12 and the output LM from processing part 22.

The processor 13 is adapted for determining at least one calibration factor using the measured length LM of the twine and the measured signals SB received from the star wheel sensor 12. A calibration factor C can e.g. be determined using the following equation:

$$[LM]t1,t2 = [\# \text{ counted teeth star wheel}]t1,t2 * C$$

The twine length LM is preferably measured during a period [t1,t2] which allows accurate measuring of the twine length. As illustrated in FIG. 2A, the twine length may be measured between a first time t1 and a second time t2 which corresponds with a period somewhere between the first knot 45 and the second knot 46 of a loop that is made around a bale. More preferably, time t1 corresponds to a moment in time shortly after the moment at which the first knot 45 is made, wherein sufficient time is left in between the forming of the first knot and t1. Similarly, time t2 preferably corresponds to a moment in time shortly before forming the second knot but sufficiently before forming the second knot to avoid errors. In that way, the zones surrounding the knotting activity are avoided, hence, avoiding unreliable measurement signals due to interference of the tension compensation mechanism and the rapid movement of the twines during knotting. In other words, the twine length LM is preferably measured in the zone of steady state movement of the twine between two knotting cycles. The number of teeth mentioned in the formula above corresponds with the number of measured teeth during the same time period [t1, t2].

According to a variant, the movement of the binding material is measured between a first time t1 corresponding with a first number of plunger strokes performed by the baler since the beginning of the formation of the bale, and a second time t2 corresponding with a second larger number of plunger strokes performed by the baler since the beginning of the formation of the bale. Further the skilled person understands that it is possible to perform a number of consecutive measurements and to use an average value. Also, it is possible to configure the processor part 22 to warn the operator in case of a significant divergence from the average value. By doing so, the operator can be warned early in case one of the twines is broken or one of the twine sources are finished. When one of the twines is no longer wrapped around the bale, it will have a significant impact on the overall strength of the remaining binding twines. The expansion forces of the formed bale will then be divided on the remaining twines, which will in some case not be sufficient to hold the bale together resulting in the snapping of the twines. So, as soon as a significant divergence is measured form the average value, the operator may decide to stop the baling process and restore the broken twine or place a new twine source.

After determining the calibration factor, the length of a bale can be determined by counting the number of teeth during a time period [t0, t3] which corresponds with the beginning and the end of the formation of a bale:

$$LB = [\# \text{ of counted teeth}]t0,t3 * C$$

In practice, after calibration, the movement of crop material in the bale chamber is continuously measured. When a desirable bale length is reached, the tying mechanism is triggered and two consecutive knots are formed.

Figure 4:
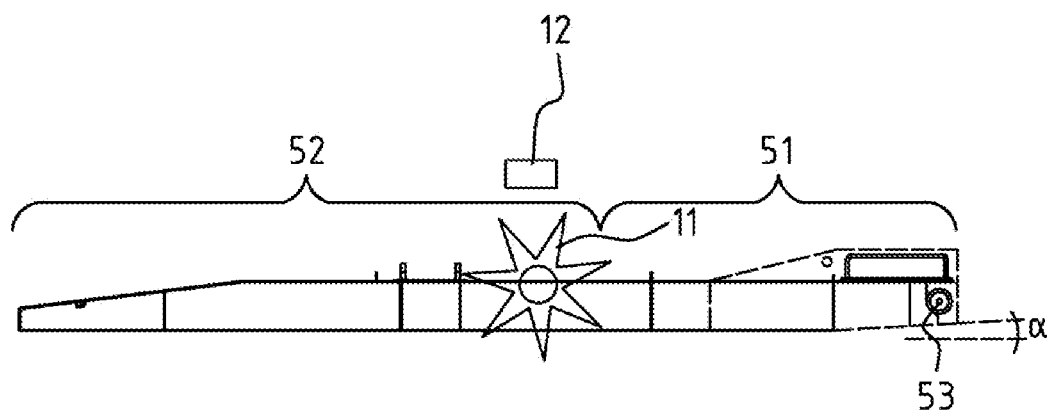
FIG. 4 is a detailed schematic side view of a top door of a bale chamber including elements of an embodiment of a bale measuring system of the invention.

The star wheel 11 is rotatably mounted on a shaft extending in a lateral direction of the baler. The teeth of the star wheel 11 impinge the adjacent crop material of a bale. Thus the star wheel is driven by the forward and backward movement of a bale in the bale chamber. FIG. 4 illustrates an example of a top door of the bale case 1 having a first part 51 and a second part 52. The lower wall of the first part 51 is inclined under an angle α with respect to the lower wall of the second part 52. The first part 51 is meant to be located near the plunger 10. Typically, the top door is mounted pivotally around an axis 53. Preferably, the star wheel 11 is arranged in the second part 52 but close to the first part 51. In that way, the star wheel 11 will engage in a more or less stabilized part of the bale.

Figure 3:
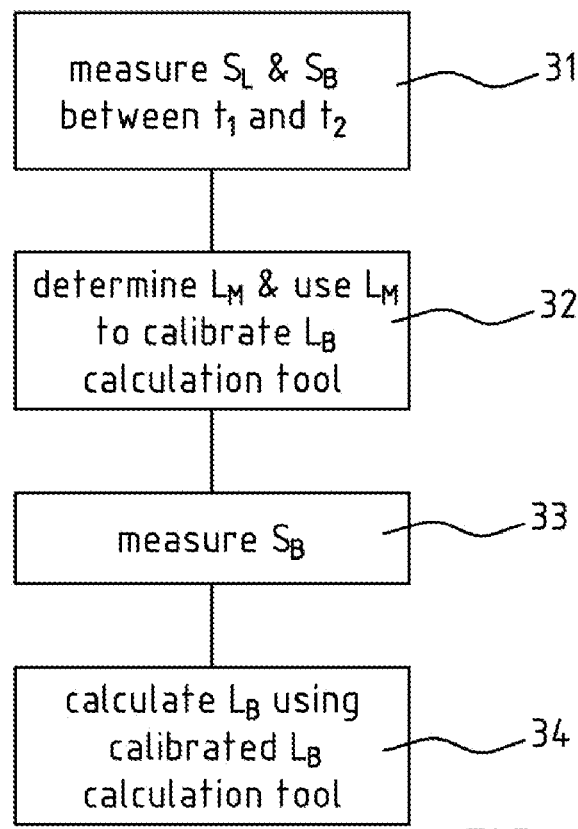
FIG. 3 is a flow chart illustrating an embodiment of the method of the invention.

FIG. 3 illustrates schematically embodiment of a bale measuring method for a rectangular baler. In a first step 31 the movement of the binding material is sensed, e.g. through signals SL measured by sensor 21, and the movement of the bale is sensed, e.g. through signals SB measured by sensor 12, between time t1 and t2. In a second step 32 the total measured movement LM of the binding material and the total measured movement of the crop material is compared to calibrate a measurement and calculation tool for measuring a movement of the bale in the baler. In a third step 33 the calibrated measurement and calculation tool is used to sense signals SB, and in a fourth step 34 the length of the bale (LB) is determined using the calibrated measurement and calculation tool.

In the examples given above one calibration parameter is determined. However the skilled person will understand that other models are possible to relate the measurement of the movement of the binding material (LM) to the measurement of the movement of the crop material (e.g. the number of counted teeth of the star wheel) using more than one calibration factor and/or using a non-linear relationship between the movement of the binding material (LM) and the measurement of the movement of the crop material (e.g. the number of counted teeth of the star wheel).

Without loss of generality, the calculation of the calibration parameter may be repeated for every new bale that is being formed, or for every two or three bales. Also, the calibration parameter may be recalculated whenever a new twine roll is installed or whenever a new baling session is started. Further, it is possible to allow an operator to request a new calibration.

For completeness the following is noted. At the beginning of a baling operation, when the baling chamber is empty, or when there is no or insufficient material present at the position of the star wheel, the star wheel will not function. As a consequence, this can lead to long bales that have to be cut. In such a situation, embodiments of the invention allow to use the measurement that is being performed by the binding material measurement system as a basis for deciding to activate the knotting system. In that way it can be decided to trigger the knotting system earlier in time such that a shorter first bale is obtained which can then be cut open. In that way, a normal operation of the baler can be obtained within a shorter time. In other words, according to embodiments of the invention, the measurement performed on the binding material may be used on its own for deciding to knot the first bale, while for the following bales, the measurement of the binding material may be used in combination with the measurement performed by the star wheel to determine the length of the bale and the moment of triggering the knotting system.

While the principles of the invention have been set out above in connection with specific embodiments, it is to be understood that this description is merely made by way of example and not as a limitation of the scope of protection, which is determined by the appended claims.

The invention claimed is:

1. A bale measuring method for a rectangular baler, the baler including a control system having a processor, the bale measurement method comprising:
   moving a bale through a chamber of the baler, the bale being formed by a crop material;
   measuring, with the control system, movement of a binding material that is being tied around the bale as the bale is moved through the chamber, the movement being measured based on signals received from a first sensor of the baler;
   calculating, with the control system, a calibration factor based on the measured movement of the binding material determined using the signals received by the control system from the first sensor;
   measuring, with the control system, the movement of the crop material through the chamber being measured based on signals received from a second sensor of the baler; and
   determining, with the control system, a length of the bale based on the measured movement of the crop material and the calibration factor.

2. The bale measuring method of claim 1, wherein the second sensor comprises a measuring wheel which engages the crop material and rotates as the crop material is being moved through the chamber of the baler; and wherein a number of rotations of the measuring wheel is counted as the bale moves rearward in the baler and the length of the bale is determined based on said number of rotations and said calibration factor.

3. The bale measuring method of claim 1, further comprising tying the binding material around the bale by performing a first knot at a first end of the bale and a second knot at a second end of the bale, and wherein the movement of the binding material is measured after performing the first knot and before performing the second knot.

4. The bale measuring method of claim 3, wherein the measurement of the movement of the binding material is started a predetermined time after performing the first knot and is stopped when a predetermined value for a length of the movement of the binding material is reached.

5. The bale measuring method of claim 1, wherein the correction factor is based on a comparison of the measured movement of the binding material with the measured movement of the bale, said movements of the binding material and the bale being measured at the same time.

6. The bale measuring method of claim 1, further comprising triggering a tying mechanism of the baler when the determined length reaches a predetermined value.

7. The bale measuring method of claim 1, wherein the binding material that is being tied around the bale is tensioned using a tensioner, and the position of the tensioner is measured and used to determine the calibration factor.

8. The bale measuring method of claim 1, wherein the movement of the binding material is measured between a first time corresponding with a first number of strokes performed by the baler since the beginning of the formation of the bale, and a second time corresponding with a second larger number of strokes performed by the baler since the beginning of the formation of the bale.

9. A bale measuring system for a rectangular baler comprising:
   a chamber through which crop material forming a bale is moved within the baler;
   a first sensor configured to measure movement of a binding material that is being tied around the bale as the bale is moved through the chamber;
   a second sensor configured to measure movement of the bale through the chamber; and
   a control system configured to receive signals from the first and second sensors, the control system including a processor configured to:
   measure the movement of the binding material based on the signals received from the first sensor
   measure the movement of the bale based on the signals received from the second sensor;
   determine at least one calibration factor based on
   the measured movement of the binding material and
   the measured movement of the bale; and
      determining a length of the bale based on the at least one calibration factor and the measured movement of the bale.

10. The bale measuring system of claim 9, further comprising a measuring wheel adapted to engage in the crop material and to rotate as the bale is being moved in the baler; the second sensor configured to measure the rotation of the measuring wheel; and the processor configured to determine the length of the bale based on the measured rotation and the at least one calibration factor.

11. The bale measuring system of claim 9, further comprising a knotter adapted to perform a first knot at a first end of the bale and a second knot at a second end of the bale, wherein the processor is configured to measure the movement of the binding material based on the signals received from the first sensor after the knotter performs the first knot and before the knotter performs the second knot.

12. The bale measuring system of claim 11, wherein the processor is adapted to start measuring the movement of the binding material based on the signals received from the first sensor at a predetermined time after the first knot is performed and to stop measuring the movement of the binding material when a predetermined value for the movement is reached.

13. The bale measuring system of claim 9, wherein the processor is adapted to determine the at least one calibration factor based on a comparison of the measured movement of the binding material with the measured movement of the bale, said movements of the binding material and the bale being measured at the same time.

14. The bale measuring system of claim 9, further comprising a tying mechanism and a third sensor configured to trigger the tying mechanism of the baler when the determined length of the bale reaches a predetermined value.

15. The bale measuring system of claim 9 in combination with the rectangular baler, wherein the bale measuring system is connected to the baler for determining the length of bales produced by the rectangular baler within the chamber.

16. The bale measuring system and rectangular baler of claim 15, wherein the baler further comprises a plunger, and a bale case at least partially defining the chamber, the bale case having an outlet and a top door with a first part adjacent the plunger and a second part adjacent the outlet, said first part having a lower wall which is inclined under an angle α with respect to a lower wall of the second part, a measuring wheel being arranged in the second part and closer to the first part than to the outlet.

\* \* \* \* \*